US007916135B2

(12) United States Patent
Kuo et al.

(10) Patent No.: US 7,916,135 B2
(45) Date of Patent: Mar. 29, 2011

(54) TIMING CONTROLLER AND METHOD OF GENERATING TIMING SIGNALS

(75) Inventors: Chun Hung Kuo, Tainan (TW); Heng Sheng Chou, Guansi Township, Hsinchu County (TW)

(73) Assignee: AU Optronics Corporation, Hsinchu (TW)

( * ) Notice: Subject to any disclaimer, the term of this patent is extended or adjusted under 35 U.S.C. 154(b) by 837 days.

(21) Appl. No.: 11/075,907

(22) Filed: Mar. 8, 2005

(65) Prior Publication Data

US 2006/0202981 A1 Sep. 14, 2006

(51) Int. Cl.
*G09G 5/00* (2006.01)
*G06F 3/038* (2006.01)

(52) U.S. Cl. ........................................ 345/213; 345/214

(58) Field of Classification Search .................. 345/213, 345/691, 692, 693, 204
See application file for complete search history.

(56) References Cited

U.S. PATENT DOCUMENTS

| | | | | |
|---|---|---|---|---|
| 5,596,349 A * | 1/1997 | Kobayashi et al. | ........... | 345/690 |
| 5,945,983 A * | 8/1999 | Kanno et al. | .................. | 348/537 |
| 6,538,648 B1 * | 3/2003 | Koike et al. | .................. | 345/213 |
| 6,636,205 B1 * | 10/2003 | Lasneski | ...................... | 345/213 |
| 7,692,615 B2 * | 4/2010 | Morita | ........................... | 345/96 |
| 2009/0201274 A1 | 8/2009 | Kuwabara et al. | ............ | 345/208 |

FOREIGN PATENT DOCUMENTS

JP 2005-176589 6/2005

OTHER PUBLICATIONS

Asia Display/IMID O4 Proceedings; Y. Nakajima et al.; "The Latest Poly-Si TFT Circuit Technologies for System-On-Glass LCD"; pp. 1-6; 2004.

* cited by examiner

*Primary Examiner* — Kevin M Nguyen
(74) *Attorney, Agent, or Firm* — Ware, Fressola, Van Der Sluys & Adolphson LLP

(57) ABSTRACT

A timer controller and method of generating timing signals uses a synchronization signal and a clock signal to generate a timing signal by counting the clock signal only after the synchronization signal has changed states. In a display requiring a dot or line counter having n digits to meet the requirement of display resolution, it is possible to use a counter with k digits to generate a start signal, with 0≦k<n. In particular, a start signal can be generated even without a counter.

20 Claims, 14 Drawing Sheets

TIMING CONTROLLER AND METHOD OF GENERATING TIMING SIGNALS

FIELD OF THE INVENTION

The present invention relates to a timing controller for use in generating timing signals particularly for driving circuits associated with display panels, including display panels fabricated using low-temperature polysilicon (LTPS).

BACKGROUND OF THE INVENTION

Display panels typically require various driver circuits for proper operation. Such circuits include source driver circuits, gate driver circuits and the like. The integrated circuits associated with such display drivers typically include timing generators, DC-DC converters, amplifiers, signal processors, CPUs, memories and the like. Among these circuits the timing controller is responsible for providing control signals to the driver circuits, including such control signals as horizontal start (HST), horizontal clock (HCK), vertical start (VST), vertical clock (VCK) and the like. Such a typical control circuit and associated display is shown in FIG. 1.

For such displays, a timing controller typically comprises two counters; namely, a dot counter (H counter) for the horizontal direction and a line counter (V counter) for the vertical direction. Schematically the time controller is shown in FIG. 10. The number of binary digits required for these counters is typically determined by the pixel resolution of the associated display. Thus, for example, for a QVGA display comprising 240 pixels in the horizontal direction and 320 pixels in the vertical direction, the horizontal direction would require a dot counter that could count to a number greater than 240 and therefore would require at least eight binary digits (that is $2^8=256>240$). In fact, depending upon the required length of time for horizontal blanking (known as horizontal blanking time), the horizontal count time could be an additional 10%, which for a 240 pixel width would add 24 pixels, making the total horizontal count equal to 264. In such a case, nine binary digits are required ($2^9=512>264$) and the counter repetitively counts from 0 to 263. Such a counter is shown in FIG. 2.

As seen in FIG. 1, a display panel 10 known in the art typically includes a timing controller 12, a gate driver 14, a data driver 16 and a display area 18, wherein the display area has a horizontal dimension of a number of pixels and a vertical dimension of a number of lines, where each line contains a set number of pixels. Thus, in a QVGA-type display, the display area has 240 pixels for each horizontal line and 320 vertical lines, for a total of 76,800 pixels.

As is known in the art, a control signal is generated by the timing controller 12 for controlling the data driver which, in conjunction with the gate driver and its associated control signal, provides for controlled activation or deactivation of each pixel in the display area. Thus, in the horizontal direction for a QVGA-type display area, a pixel (or dot) counter is required that can count the 240 pixels of the display, plus an additional amount of time equal to approximately 10% of the horizontal pixel resolution for purposes of horizontal blanking. Thus, in a typical situation where the blanking time is 10% of the horizontal resolution, the dot counter needs to be able to count to 240 plus 0.1×240, which is equal to 264. FIG. 2 shows a prior art counter comprising nine binary (two-bit) counters 21 which can count from 0 to 512 ($2^9=512$). For the horizontal display of a QVGA display with a 10% blanking time, this counter typically counts from 0 to 263 based upon the output C0-C8. As shown in FIG. 2, the counter has nine flip-flops 21. FIGS. 3*a*-3*d* show exemplary timing diagrams for the horizontal timing. The output C0 is used to generate the horizontal clock (HCK) signal as shown in FIG. 3*c*. When the number of clock signals (DCLK) reaches 255, a horizontal start signal (HST) is activated, as shown in FIG. 3*d*. As can be seen in FIG. 3*c*, the HCK signal changes state for each complete clock signal and is triggered by the C0 output of binary counter #1. The HST signal is generated when the clock signal (DCLK) reaches a particular value as shown in FIG. 3*d*. In the present example where the horizontal resolution is 240, the horizontal start signal is generated when the clock signal has had 255 cycles.

As it is known in the art, it is required to use an output generator, which is operatively connected to the 9-bit counter to generate the HST signal based on the output of the 9-bit counter. Furthermore, the 9-bit counter has to be reset when its output reaches 264. A typical output generation scheme for generating the HST and HCK signals from the DCLK and Hsync signals is shown in FIG. 4.

In the vertical direction for a QVGA display, there are 320 lines and thus a nine digit binary counter is required ($2^9>320$). Such a counter is shown in FIG. 5. As shown, the counter has nine flip-flops 21. Again, if vertical blanking time is included, such blanking time is typically approximately 10% of the total number of lines, and thus the total number of counts required to be counted in the vertical direction is equal to 320+32=352 and thus the counter would count repetitively from 0 to 351, as determined by the counter outputs N0-N8. FIGS. 6*a*-6*d* show exemplary timing diagrams for the vertical timing. As shown, the output N0 from the first binary counter (1) shown in FIG. 5 is used to generate the vertical clock (VCK) signal as shown in FIG. 6*c*. This horizontal sync signal (Hsync) counts up to 351 and is used for generating a vertical start signal (VST) when the count reaches 339, as shown in FIG. 6*d*. It is seen that the vertical clock signal (VCK) changes state for each cycle of the horizontal sync signal (Hsync) and that the vertical sync signal changes state when the $330^{th}$ line is generated while the vertical start signal is generated during the vertical blanking time and, in the example shown in FIG. 6*d*, when the $339^{th}$ line is generated during vertical blanking (vertical blanking is between the $304^{st}$ and the $340^{nd}$ line). As with the dot counter in the horizontal direction, the line counter in the vertical direction also needs an output generator to generate the VST signal and to reset the line counter when the line counter reaches 352. A typical output generation scheme for generating the VST and VCK signals from the Hsync and Vsync signals is shown in FIG. 7.

As seen in FIG. 8, for a QVGA display the horizontal start signal is typically generated at the $255^{th}$ count where the counter counts from 0 to 263 and therefore a nine stage binary counter as shown in FIG. 4 is required in a conventional design. Similarly, the vertical start signal is typically generated at the $339^{th}$ count where the counter counts from 0 to 351 and therefore a nine stage binary counter as shown in FIG. 7 is required.

In view of the foregoing, it can be seen that in general a timing controller for use in a display panel typically requires a full counter for both the horizontal pixel count and the vertical line count, wherein these counters respectively activate the generation of a horizontal start signal (HST) and a vertical start signal (VST). Thus, in the display discussed above, the horizontal start signal (HST) is generated when the count reaches 255 and the vertical start signal (VST) is generated when the vertical line count reaches 339.

SUMMARY OF THE INVENTION

It is desirable to have a new type of timing controller which can make use of counts that are less than the entire horizontal count and the entire vertical line count in order to reduce the number of binary digits needed for such counters. If the number of binary digits can be reduced, the integrated circuit area needed to produce such counters is concomitantly reduced as well as the power consumption necessary for energizing these counters. The timing controller according to the present invention is able to reduce the number of binary digits for the associated horizontal and vertical counters which would otherwise be necessary if the entire horizontal and vertical counts are used for generating the horizontal start (HST) signal and the vertical start (VST) signal.

Thus, the first aspect of the present invention provides a method for generating a timing signal based upon a first periodic signal and a second periodic signal, the first periodic signal having a first signal cycle in a time unit, wherein the second periodic signal has a second signal cycle smaller than $2^n$ first signal cycles but greater than or equal to $2^{(n-1)}$ first signal cycles, with n being a predetermined positive integer, said method comprising the steps of:

determining when the second periodic signal changes from state one to state two;

starting a count of the first signal cycles when the second periodic signal changes from state one to state two based on said determining; and generating an edge of the timing signal when said count reaches L first signal cycles, wherein $0 \leqq L \leqq (2^k-1)$ and $0 \leqq k<n$.

According to the present invention, the first periodic signal is a clock signal, the second periodic signal is a horizontal synchronization signal, and the timing signal is a horizontal start signal in a display panel.

According to the present invention, the first periodic signal can also be a horizontal synchronization signal, the second periodic signal is a vertical synchronization signal, and the timing signal is a vertical start signal in a display panel.

According to the present invention, state one is representative of a first voltage level of the second periodic signal and state two is representative of a second voltage level of the second period signal, wherein the second voltage level is lower than the first voltage level.

In one embodiment of the present invention, the second periodic signal changes from state one to state two at a first position in the second signal cycle, and the second period signal also changes from state two to state one at a second position within said second signal cycle, and wherein the first edge of the timing signal is located before the second position and the second edge of the timing signal is located after the second position.

In other embodiments of the present invention, both the first edge and the second edge of the timing signal are located before the second position, or both the first edge and the second edge of the timing signal are located after the second position.

In yet another embodiment of the present invention, the first edge of the timing signal is located at the first position and the second edge of the timing signal is located at the second position.

The second aspect of the present invention provides a timing controller for use in a display panel having a plurality of pixels organized in a plurality of horizontal lines, the timing controller configured to receive a clock signal and a horizontal synchronization signal for providing a horizontal start signal, wherein the horizontal start signal is arranged to control the pixels in a horizontal line, wherein the clock signal has a clock cycle and the horizontal synchronization signal has a horizontal signal cycle smaller than $2^n$ clock cycles but greater than or equal to $2^{(n-1)}$ clock cycles, with n being a predetermined positive integer, the horizontal synchronization signal having state one and state two in each horizontal signal cycle, and wherein a horizontal start signal is arranged for providing a starting time for controlling the pixels in the horizontal line, the horizontal start signal having a horizontal signal edge, said time controller comprising:

a horizontal counter comprising at least k bits, responsive to a change of the horizontal synchronization signal from state one to state two, for starting a count of the clock cycles such that when said count reaches L clock cycles, said horizontal counter produces the horizontal signal edge, wherein k is an integer such that $0 \leqq k<n$ and $0 \leqq L \leqq (2^k-1)$.

According to the present invention, the display panel is further configured to receive a vertical synchronization signal for providing a vertical start signal, wherein the vertical start signal is arranged to select at least one of the horizontal lines of the pixels, the vertical synchronization signal having a vertical signal cycle smaller than $2^m$ horizontal signal cycles but greater than or equal to $2^{(m-1)}$ horizontal signal cycles, with m being a predetermined positive integer, the vertical synchronization signal having state one and state two in each further signal cycle, the vertical start signal having a vertical signal edge, said timing controller further comprising:

a vertical counter comprising at least j bits, responsive to a change in the vertical synchronization signal from state one to state two, for starting a further count of the horizontal signal cycles such that when said further count reaches L' horizontal signal cycles, said vertical counter produces the vertical signal edge, wherein j is an integer such that $0 \leqq j<m$ and $L' \leqq (2^j-1)$.

According to one embodiment of the present invention, the counting means comprises k binary counters, each counter having an output connected to the determining means for providing the count of the clock cycles, and wherein the clock signal and the horizontal synchronization signal are connected to the counting means through a logic component such that the counting means counts the clock cycles in a signal cycle of the horizontal synchronization signal only when the horizontal synchronization signal is in state two.

In another embodiment, the counting means is connected to the clock signal and the horizontal synchronization signal, the counting means comprising k binary counters, each counter having an output connected to the determining means for providing the count of the clock cycles of the clock signal in a signal cycle of the horizontal synchronization signal, and the horizontal synchronization signal is further connected to the determining means so as to allow the determining means to produce said first edge based on said change of the horizontal synchronization signal from state one to state two.

In yet another embodiment, the counting means is connected to the clock signal and the horizontal synchronization signal, the counting means comprising k binary counters, each counter having an output connected to the determining means for providing the count of the clock cycles of the clock signal in a signal cycle of the horizontal synchronization signal so as to allow the determining means to produce said first edge based on said change of the horizontal synchronization signal from state one to state two, and the determining means provides a signal to the counting means so as to disable the counting means after the first edge is produced in said signal cycle of the horizontal synchronization signal.

The present invention will become apparent upon reading the description taken in conjunction with FIGS. 11*a*-15.

BRIEF DESCRIPTION OF THE DRAWINGS

For a further understanding of the nature and objects of the present invention, reference should be made to the following detailed description taken in conjunction with the following drawings in which.

DETAILED DESCRIPTION OF THE INVENTION

Figure 1:
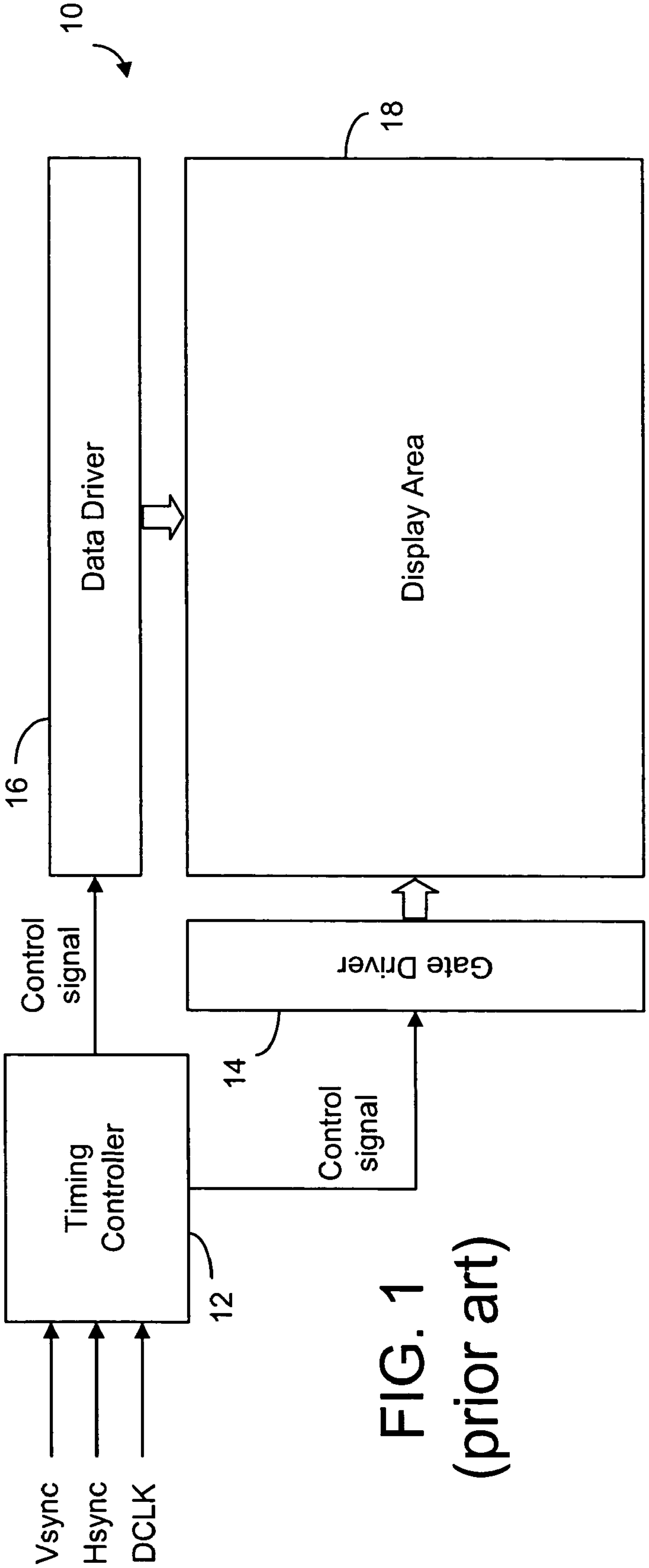
FIG. 1 (prior art)
FIG. 1 is a block diagram illustrating a timer controller, gate driver, data driver and associated display area of an overall display panel as is known in the art.
Figure 2:
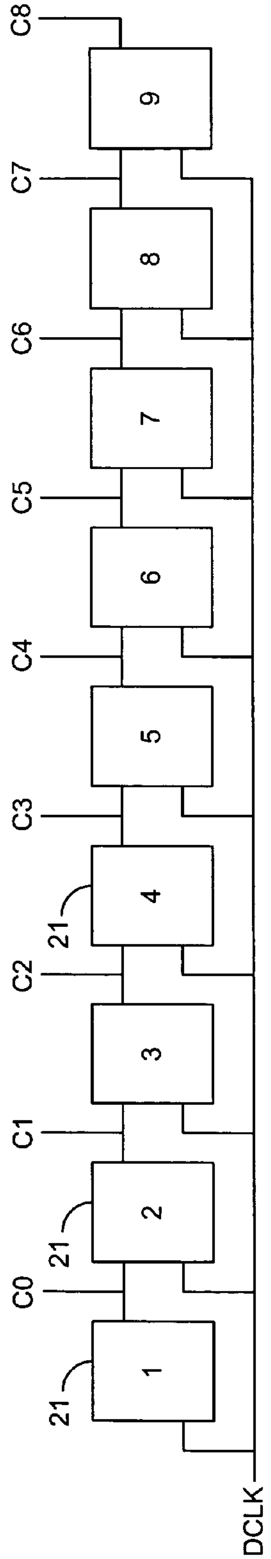
FIG. 2 (prior art)
FIG. 2 is a schematic diagram of a nine digit binary counter used to count up to $2^9$ to (512) for use in a display panel according to the QVGA standard of 240 horizontal by 320 vertical pixels.
Figure 3:
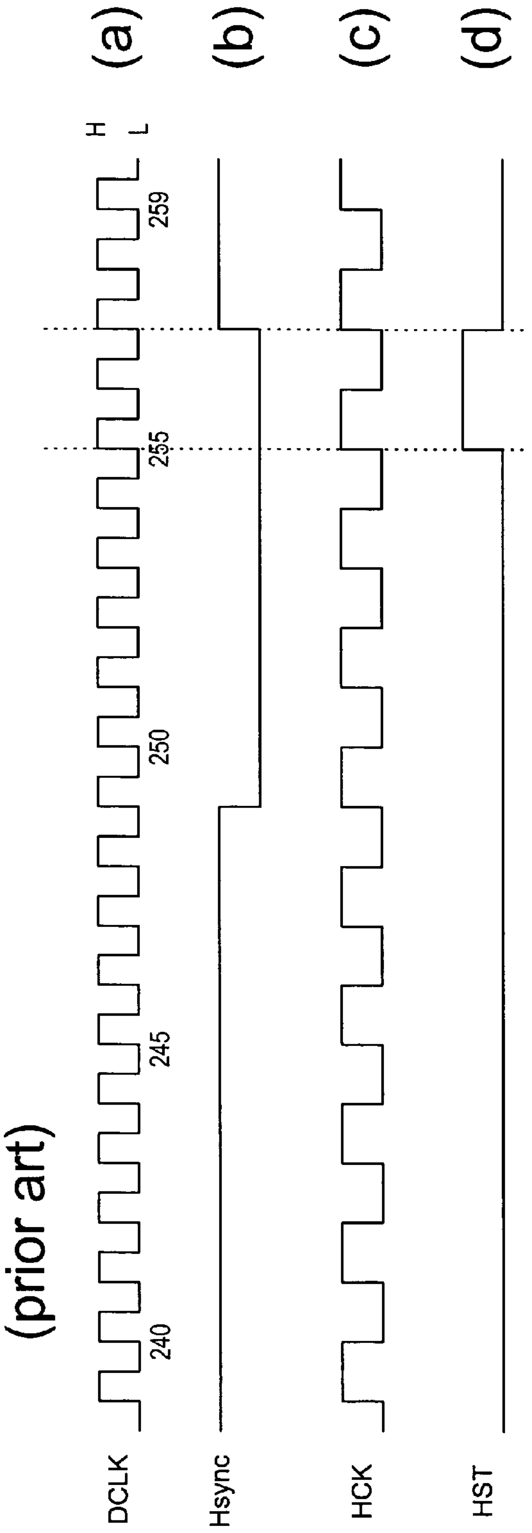
FIG. 3 (prior art)
FIG. 3*a* is a timing diagram illustrating an input clock signal.
FIG. 3*b* is a timing diagram illustrating the horizontal synchronization signal.
FIG. 3*c* is a timing diagram illustrating the horizontal clock signal.
FIG. 3*d* is a timing diagram illustrating the horizontal start signal associated with a display panel according to the QVGA standard.
Figure 11A:
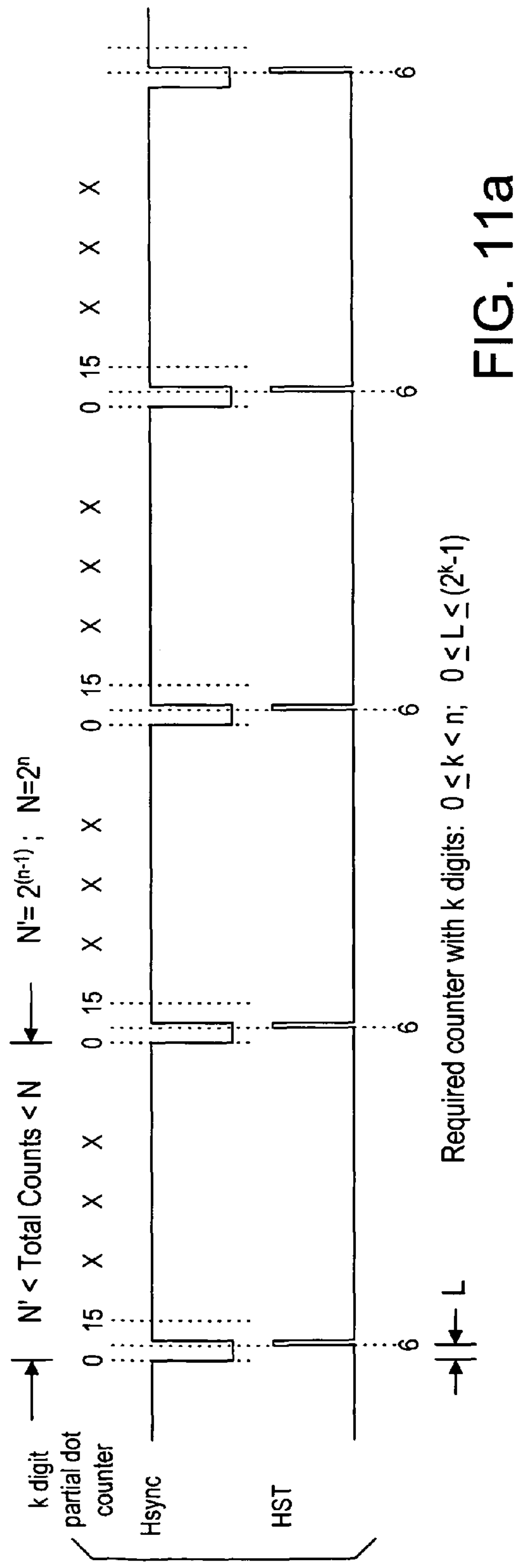
FIG. 11*a* is a timing diagram showing an example of the relationship between the horizontal synchronization and start signals and the dot counter counts, according to the present invention.
Figure 9:
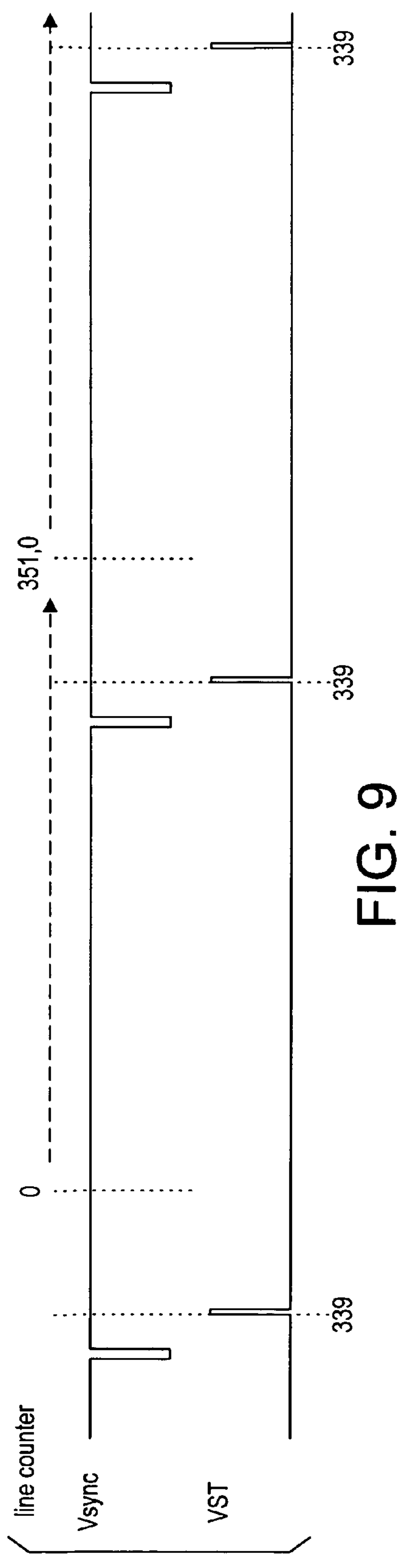
FIG. 9 (prior art)
FIG. 9 is a timing diagram showing the relationship between the vertical synchronization and start signals and the line counter counts according to the state of the art.
Figure 11B:
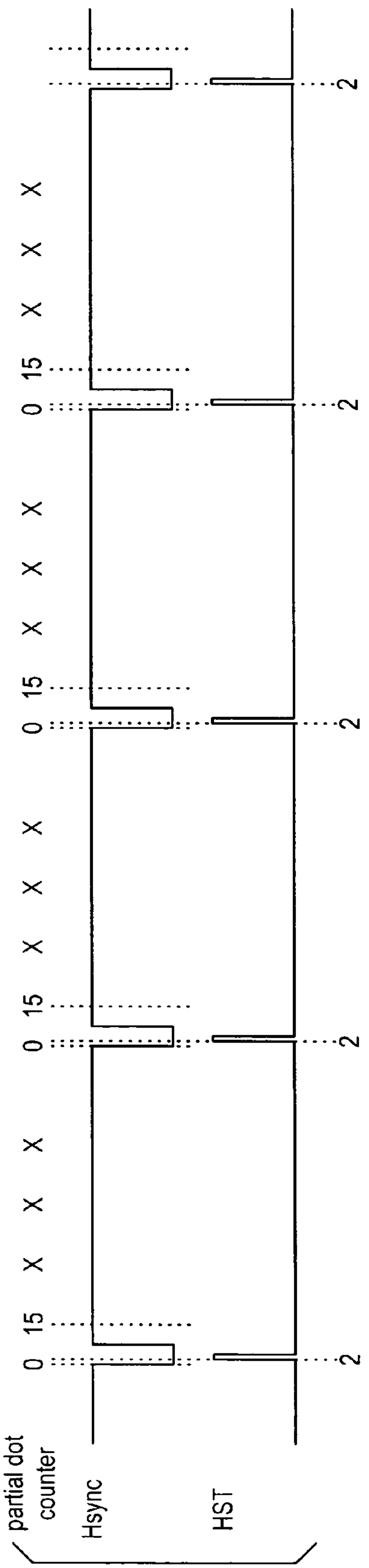
FIG. 11*b* is a timing diagram showing another example of the relationship between the horizontal synchronization and start signals and the dot counter counts, according to the present invention.
Figure 11C:
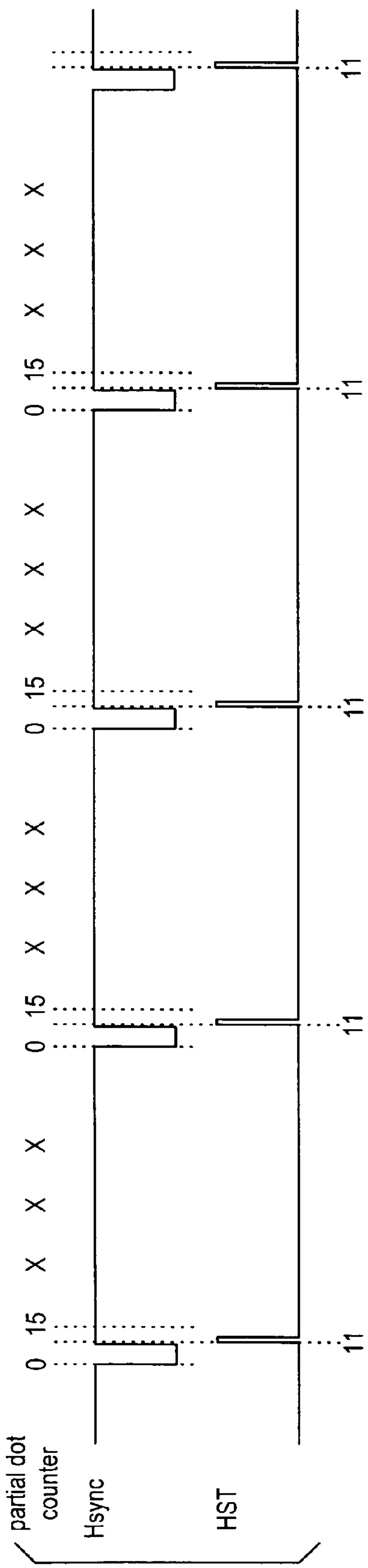
FIG. 11*c* is a timing diagram showing yet another example of the relationship between the horizontal synchronization and start signals and the dot counter counts, according to the present invention.

It can be appreciated by those skilled in the art that the timing separation between the horizontal synchronization signal and the horizontal start signal is quite small. As shown in FIGS. 3*b* and 3*d*, the horizontal synchronization signal (Hsync) changes state when the horizontal clock count reaches 249 and the horizontal start signal (HST) changes state when the horizontal clock reaches 255. Thus, the separation between the synchronization signal and the start signal is 6 horizontal clock counts when these signals are generated. With the start signal being present from count 6 to count 8, it is possible to use a partial counter having as few as four binary counters in combination with an output generator to generate the horizontal start signal based on the horizontal synchronization signal and the clock signal. FIG. 11*a* is a timing diagram showing an example of the relationship between the horizontal synchronization and start signals and the partial dot counter counts, according to the present invention. As can be seen in FIG. 11*a*, it is possible to use a partial counter having four binary digits to start counting when the horizontal synchronization signal changes state and to use an output generator to start a horizontal start signal when the partial counter reaches 6 and to reset this horizontal start signal when the counter reaches 8. It should be noted that the relationship between the horizontal start signal and the horizontal synchronization signal can be different. For example, the horizontal start signal can be started when the partial counter reaches 2 and reset when the partial counter reaches 4, as shown in FIG. 11*b*. In the examples shown in FIGS. 11*a* and 11*b*, the horizontal start signal is generated when the horizontal synchronization signal is in the L-state. However, the horizontal start signal can be generated when the horizontal synchronization signal is in the H-state. For example, the horizontal start signal is started when the partial counter reaches 11 and reset when the partial counter reaches 13, as shown in FIG. 11*c*.

Figure 11D:
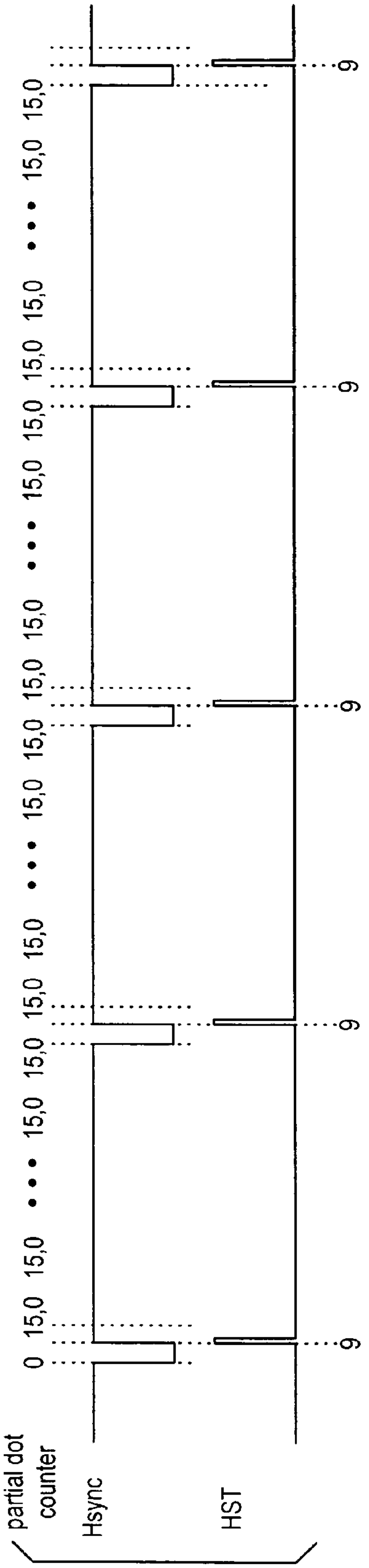
FIG. 11*d* is a timing diagram showing an example of the relationship between the trailing edge of the horizontal synchronization signal, the horizontal start signal and the dot counter counters, according to the present invention.
Figure 11E:
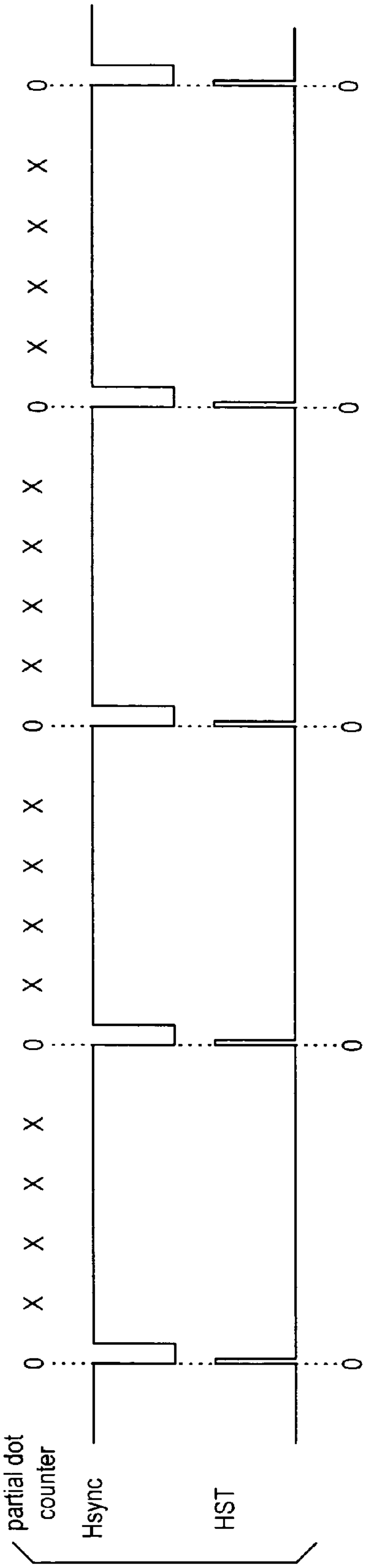
FIG. 11*e* is a timing diagram showing an example of the relationship between the leading edge of the horizontal synchronization signal, the horizontal start signal and the dot counter counts, according to the present invention.

It is possible to start the horizontal start signal at the leading edge or the trailing edge of the horizontal synchronization signal. FIG. 11*d* shows an example of the horizontal start signal wherein the leading edge of the horizontal start signal coincides with the trailing edge of the horizontal synchronization signal, whereas FIG. 11*e* shows an example of the horizontal start signal wherein the leading edge of the horizontal start signal coincides with the leading edge of the horizontal synchronization signal. In the examples shown in FIGS. 11*a* to 11*c*, the partial dot counter stops counting after the horizontal start pulse has been generated. However, the partial dot counter can keep counting in repetitive cycles, as shown in FIG. 11*d*.

Figure 11F:
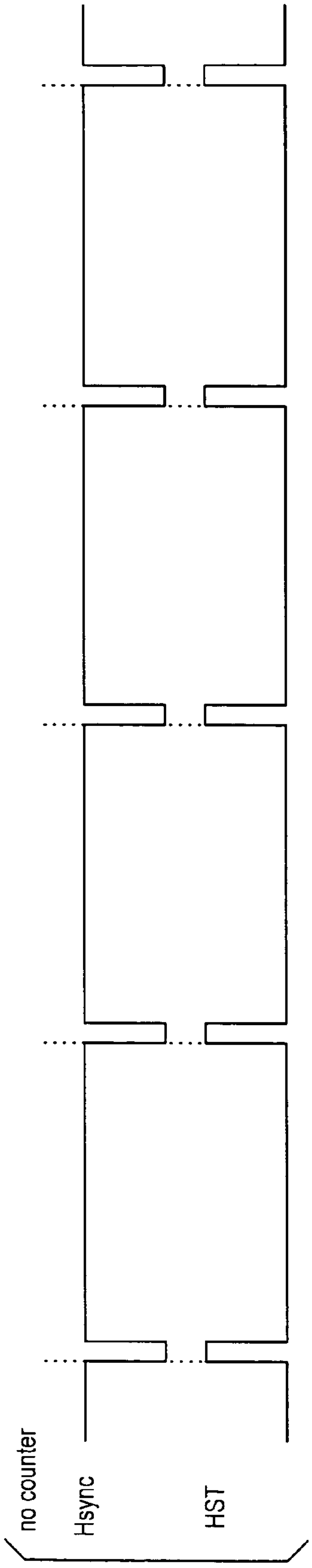
FIG. 11*f* is a timing diagram showing an example of the relationship between the horizontal synchronization signal and the horizontal start signal without taking into consideration the dot counter counts, according to the present invention.

It should be noted that the width (or duration) of the horizontal synchronization signal can be different from that shown in FIGS. 11*a*-11*d*, but the width must be a multiple of the clock cycle of (DCLK, see FIGS. 3*a* and 3*b*). Likewise, the width of the horizontal start signal can also be different from that shown in FIGS. 11*a*-11*d*), but the width of the horizontal start signal must also be a multiple of the clock cycle (DCLK). In the example shown in FIG. 11*e*, the width of the horizontal start signal is equal to two clock cycles. It is possible to use a partial dot counter having only one digit to generate the horizontal start signal. However, if the width of the horizontal start signal is equal to one clock cycle (DCLK), the partial dot counter can be eliminated. Thus, it is possible to generate the horizontal start signal having a width of one clock cycle when the leading edge of the horizontal start signal coincides with either the trailing or leading edge of the horizontal synchronization signal, as shown in FIGS. 11*d* and 11*e*, without using a dot counter. Furthermore, it is also possible to generate a horizontal start signal that is complementary to the horizontal synchronization signal, as shown in FIG. 11*f*, without using a dot counter.

In sum, in a QVGA display where the cycle (in time units) of the horizontal synchronization signal is greater than $2^8$ times the DCLK clock cycle, it is possible to use a partial dot counter having k digits to generate the horizontal start signal, with $0 \leqq k < 9$.

Figure 12A:
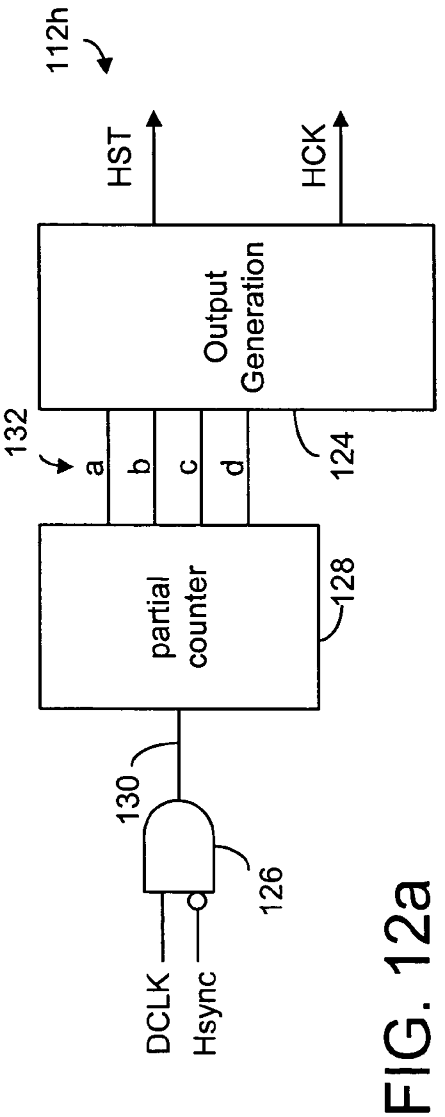
FIG. 12*a* is a block diagram showing an exemplary timing controller for generating the horizontal start signal and the horizontal clock signal, according to the present invention.

For illustrating purposes, an exemplary timing controller for generating the horizontal clock signal (HCK) and the horizontal start signal (HST) is shown in FIG. 12*a*. As shown in FIG. 12*a*, the timing controller 112*h* includes a logic (AND) gate 126 and a four-bit counter 128 whose output are connected to the output generation module 124. The gate 126 receives the clock signal (DCLK) as well as the negated Hsync signal, and the output 130 of the gate 126 transports the clock signals when the horizontal synchronization signal is in state two (see FIG. 3*b*, from H to L with H being state one). The timing controller 112*h* can be used, for example, to generate the horizontal start signal as shown in FIGS. 11*a* and 11*b*. With the AND gate 126, the partial counter 128 is used for counting only when the Hsync signal is in the L-state. As such, it is not necessary to reset or to stop the counter 128.

Figure 12B:
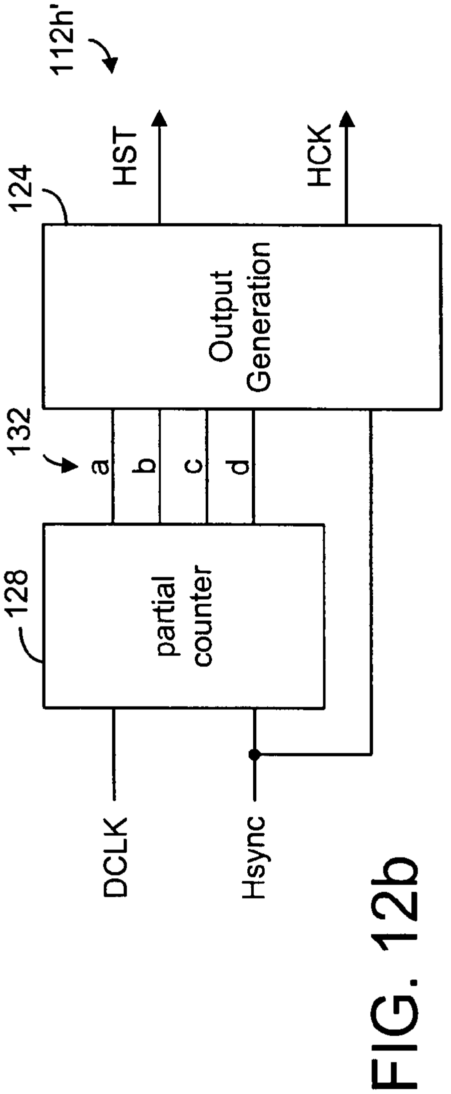
FIG. 12*b* is a block diagram showing another exemplary timing controller for generating the horizontal start signal and the horizontal clock signal, according to the present invention.
Figure 12C:
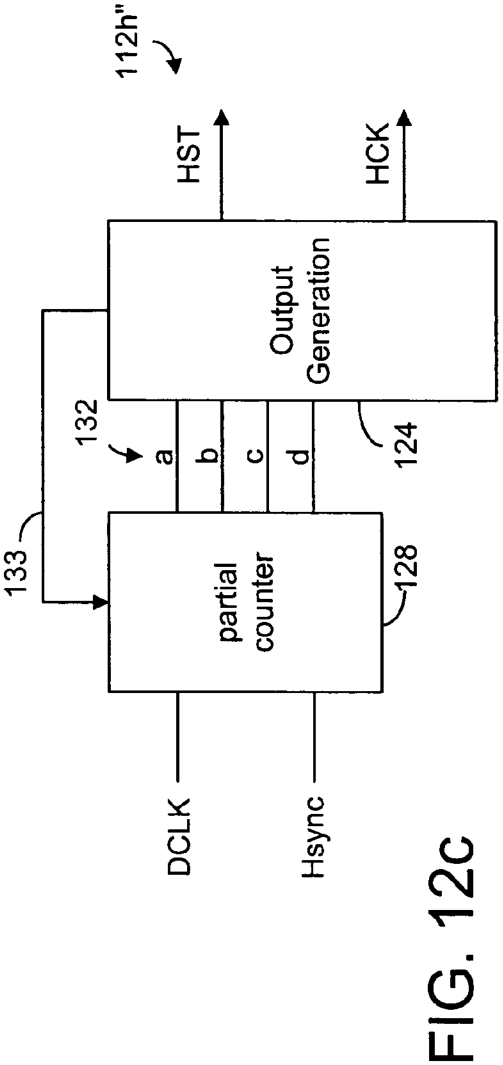
FIG. 12*c* is a block diagram showing yet another exemplary time controller for generating the horizontal start signal and the horizontal clock signal, according to the present invention.

If the horizontal start signal is generated outside the period when the Hsync signal is in the L-state, the partial counter 128 keeps counting from 1 to 15 repetitively as shown in FIG. 11*d*. It is possible to use a timing controller 112*h*' as shown in FIG. 12*b* to generate the horizontal start signal (HST) and the horizontal clock signal (HCK). It is also possible to disable the partial counter 128 after it completes its first counting cycle by a signal from the output generation module 124 in the timing controller 112*h*" as shown in FIG. 12*c*. The timing controller 112*h*" can be used, for example, to generate the horizontal start signal and the horizontal clock signal as shown in FIG. 11*d*.

Figure 12D:
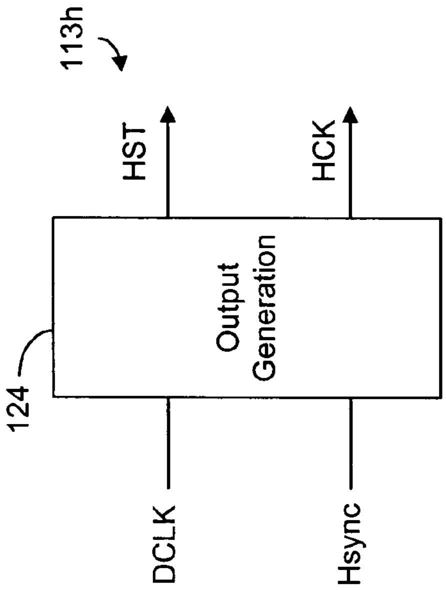
FIG. 12*d* is a block diagram showing an exemplary time controller for generating the horizontal start signal and the horizontal clock signal without using a counter, according to the present invention.

If the horizontal start signal has a width of one clock cycle (DCLK) and the leading edge of the horizontal start signal coincides with either the trailing or leading edge of the horizontal synchronization signal, as shown in FIGS. 11*d* and 11*e*, it is possible to use a timing controller without a partial counter to generate the horizontal start signal. Likewise, if a horizontal start signal is complementary to the horizontal synchronization signal, as shown in FIG. 11*f*, it is also possible to generate such a horizontal start signal without using a partial counter. FIG. 12*d* shows the timing controller 113*h* for generating the horizontal start and clock signals directly from the clock signal and the horizontal synchronization signal.

As seen in the present invention with regard to FIGS. 12*a* to 12*c*, instead of using a nine stage binary counter, a four-stage counter 128 having output 132 on lines a, b, c, d to provide a counter count between 0 to 15 to generate the horizontal start signal (HST).

Figure 6:
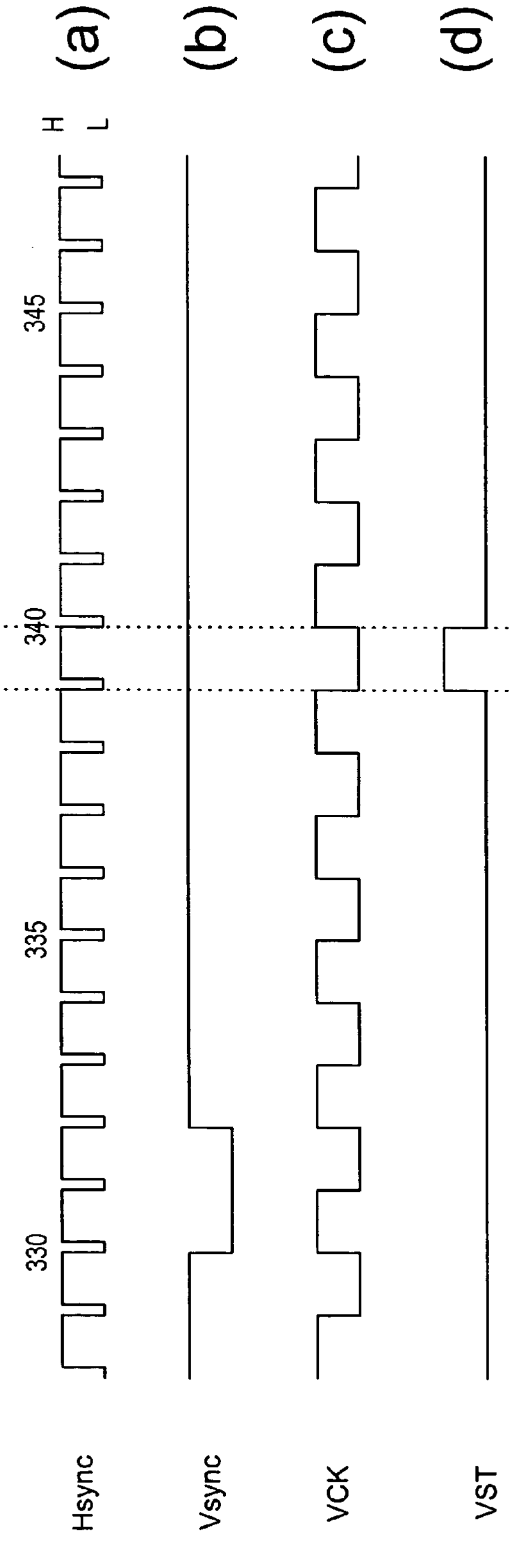
FIG. 6 (prior art)
FIG. 6*a* is a timing diagram illustrating the horizontal synchronization signal.
FIG. 6*b* is a timing diagram illustrating the vertical synchronization signal.
FIG. 6*c* is a timing diagram illustrating the vertical clock signal.
FIG. 6*d* is a timing diagram illustrating the vertical start signal associated with the vertical timing for a QVGA display panel.
Figure 8:
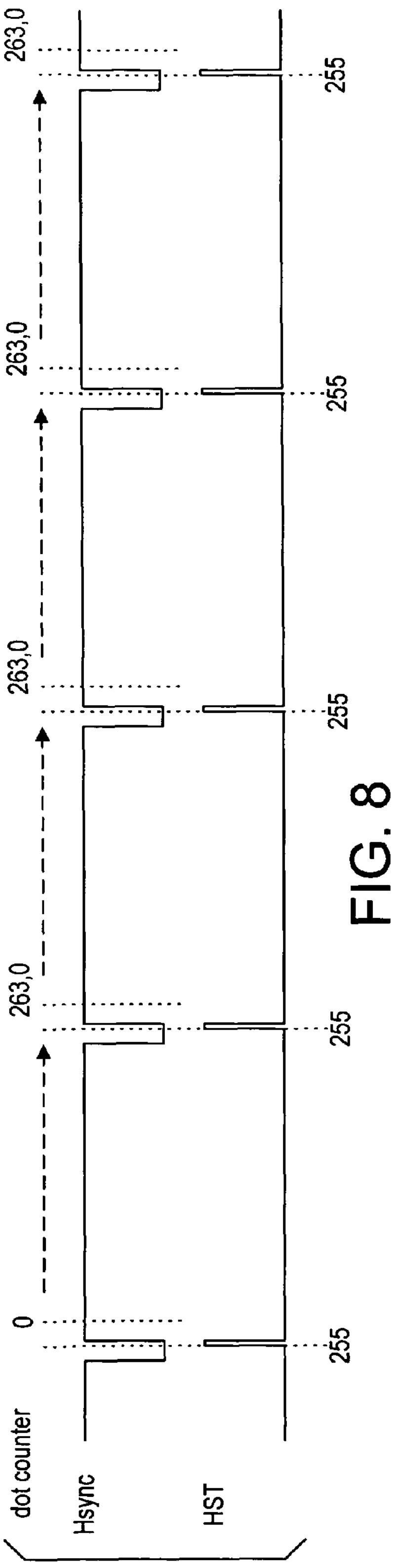
FIG. 8 (prior art)
FIG. 8 is a timing diagram showing the relationship between the horizontal synchronization and start signals and the dot counter counts according to the state of the art.
Figure 13A:
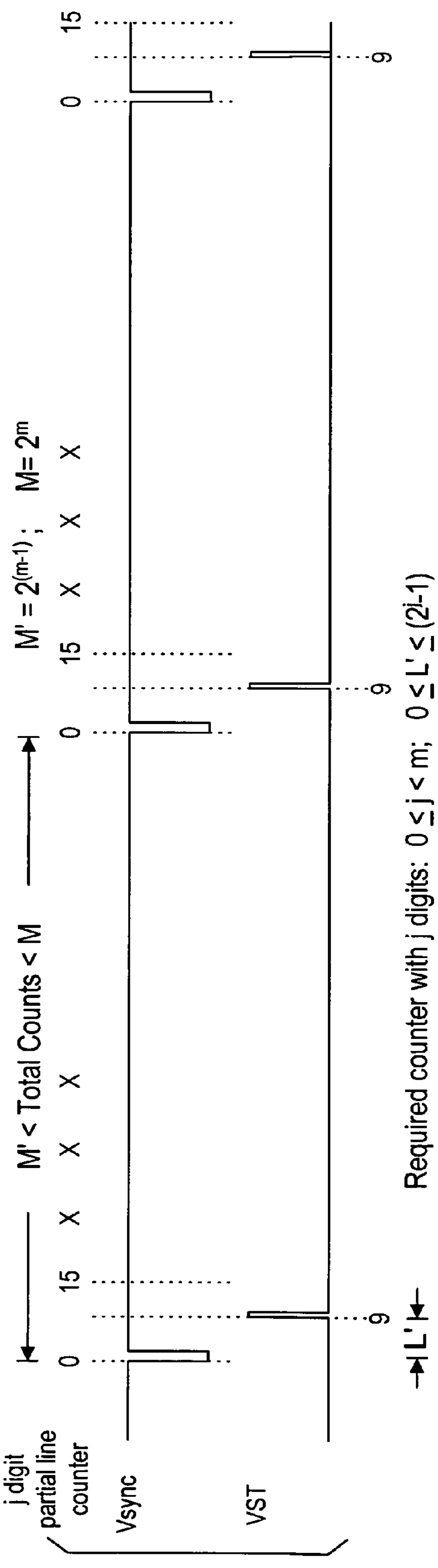
FIG. 13*a* is a timing diagram showing an example of the relationship between the vertical synchronization and start signals and the line counter counts, according to the present invention.
Figure 10:
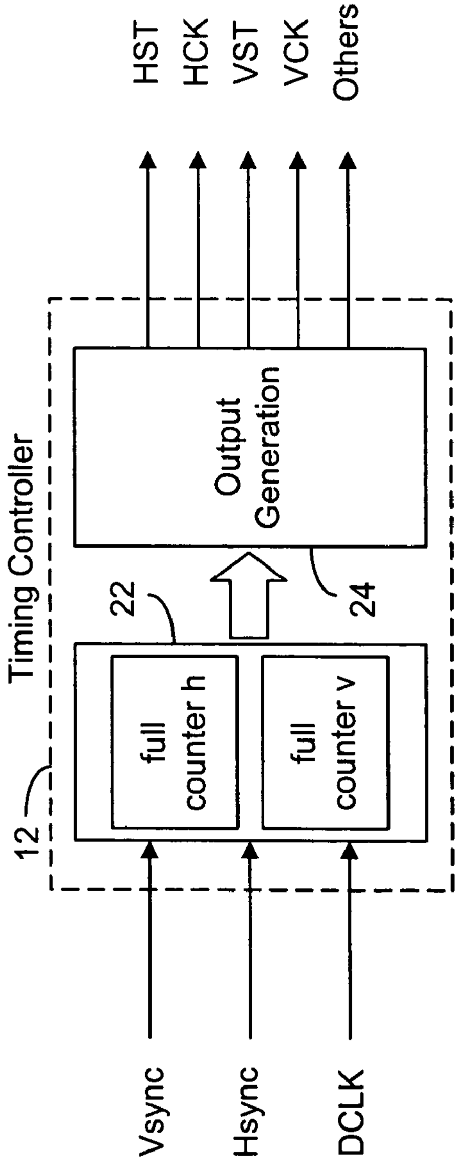
FIG. 10 (prior art)
FIG. 10 is a block diagram showing an overall prior-art timing controller.
Figure 15:
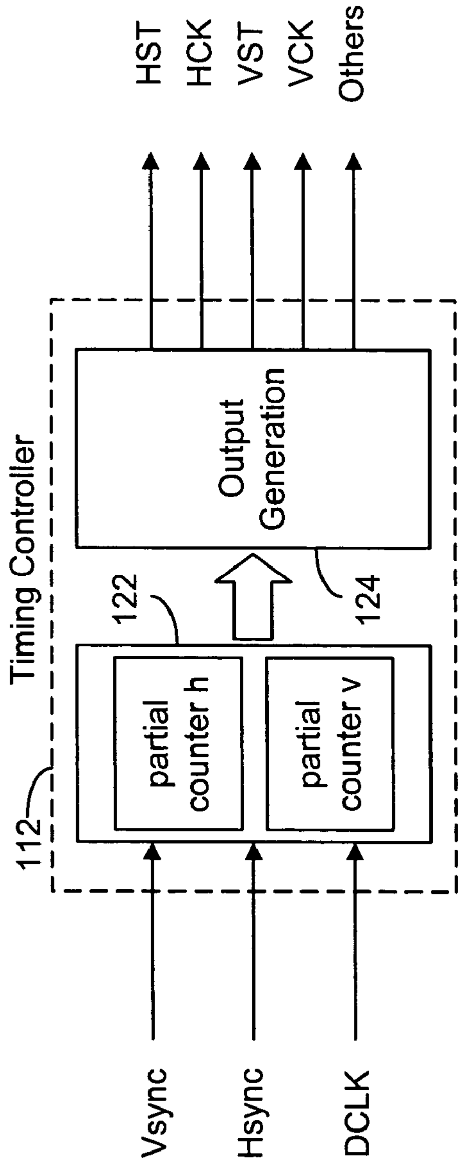
FIG. 15 is a block diagram shown the overall timing controller, according to the present invention.
Figure 13B:
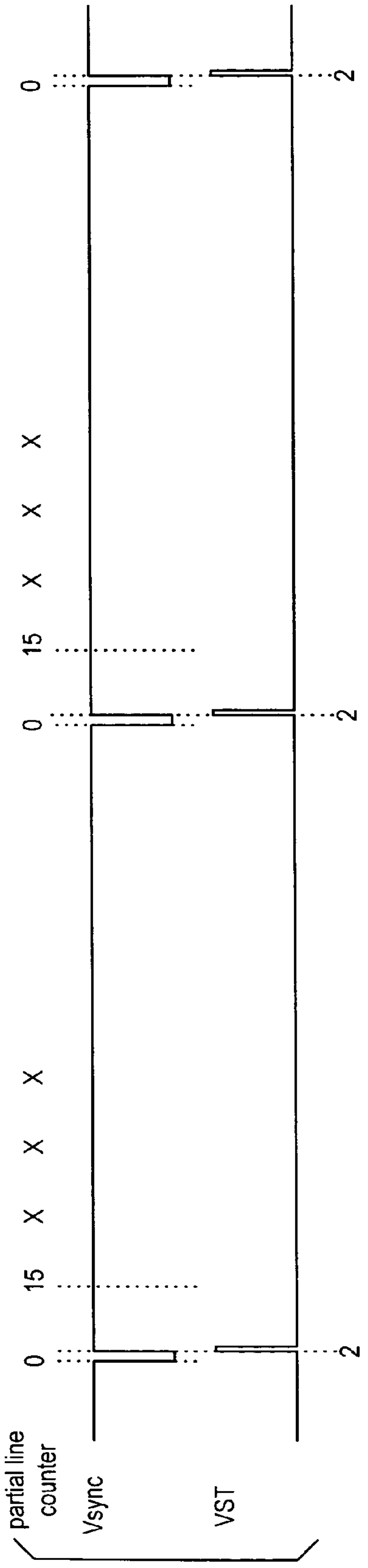
FIG. 13*b* is a timing diagram showing an example of the relationship between the trailing edge of the vertical synchronization signal, the start signal and the line counter counts, according to the present invention.

It can also be appreciated that the timing separation between the vertical synchronization signal and the vertical start signal is also small. As shown in FIGS. 6*b* and 6*d*, the vertical synchronization signal (Vsync) changes state when the line clock count (Hsync) reaches 330 and the vertical start signal (VST) changes state when the line clock count reaches 339. Thus, the separation between the synchronization signal and the start signal is 9 vertical clock counts when they are generated. Thus, it is possible to use a partial counter having as few as four binary counters in combination with an output generator to generate the vertical start signal based on the vertical synchronization signal and the horizontal synchronization signal. FIG. 13*a* is a timing diagram showing the relationship between the vertical synchronization and start signals and the partial line counter counts, according to the present invention. As can be seen in FIG. 13*a*, it is possible to use a counter having four binary digits to start counting when the vertical synchronization signal changes state and to use an output generator to generate a vertical start signal when the counter reaches 9. As with the horizontal synchronization signal and the horizontal start signal, the relationship between the vertical start signal and the vertical synchronization signal can be different. For example, the leading edge of the vertical start signal can coincide with the trailing edge of the vertical synchronization, as shown in FIG. 13*b*. Furthermore, the vertical start signal can be complementary to the vertical synchronization signal, as shown in FIG. 13*c*.

Figure 13C:
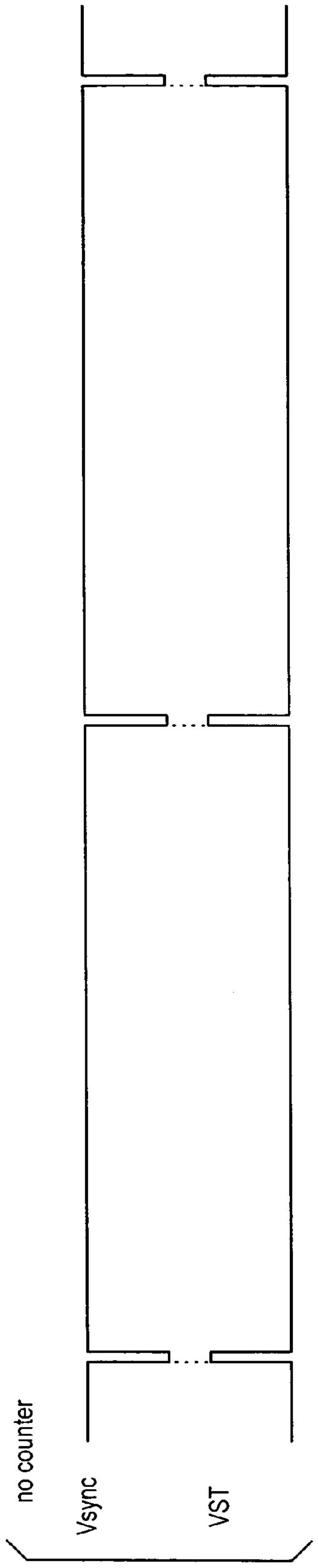
FIG. 13*c* is a timing diagram showing an example of the relationship between the vertical synchronization and start signals without taking into consideration the line counter counts, according to the present invention.

It should be noted that the width (or duration) of the vertical synchronization signal can be different from that shown in FIGS. 13*a*-13*c*, but the width must be a multiple of the cycle of Hsync (see FIGS. 6*a* and 6*b*). Likewise, the width of the vertical start signal can also be different from that shown in FIGS. 13*a*-13*c*), but the width of the horizontal start signal must also be a multiple of the Hsync. In the example shown in FIGS. 13*a* and 13*b*, the width of the horizontal start signal is equal to one Hsync cycle. It is possible to generate the vertical start signal as shown in FIGS. 13*b* and 13*c* without using a line counter. Thus, in a QVGA display where the cycle (in time units) of the vertical synchronization signal is greater than $2^8$ times the Hsync cycle, it is possible to use a partial dot counter having k digits to generate the vertical start signal, with $0 \leqq k < 9$.

The generation of vertical start signal based on Hsync and Vsync, and the generation of horizontal start signal based on DCLK and Hsync, according to the present invention, can be generalized as follows:

Either one of the vertical start signal and the horizontal start signal is treated as a timing signal having a first edge and a second edge to be generated based on a first period signal having a first signal cycle and a second periodic signal having a second signal cycle, where the duration of second signal cycle, determined by the changes of the second period signal between a first state and a second state, is between $2^{(n-1)}$ and $2^n$ times the first signal cycle. Accordingly, the timing signal can be generated based on a count of the first signal cycle from a counter having k digits such that $0 \leqq k < n$ and that the distance from a change of the second periodic signal and the first edge of the timing signal is equal to L times the first signal cycle, with $0 \leqq L \leqq (2^k - 1)$. For example, with k=4, a timing signal can be generated with L=6, as shown in FIG. 11*a*. The timing signal can be generated even without a counter (k=0), or L=0, as shown in FIG. 11*f*.

Figure 14A:
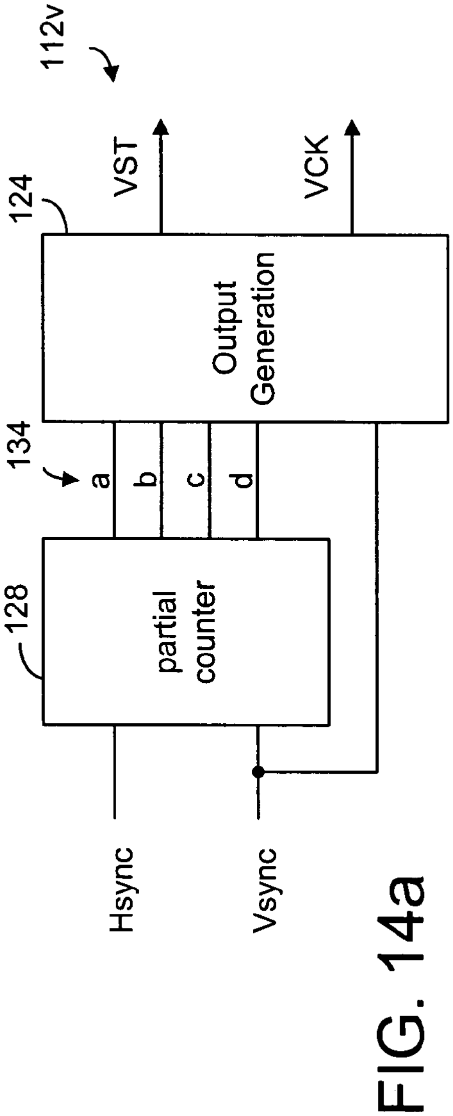
FIG. 14*a* is a block diagram showing an exemplary timing controller for generating the vertical start signal and the vertical clock signal, according to the present invention.
Figure 14B:
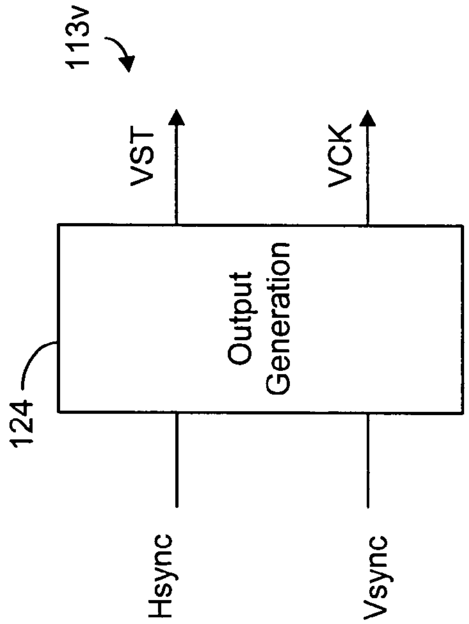
FIG. 14*b* is a block diagram showing another exemplary timing controller for generating the vertical start signal and the vertical clock signal without using a counter, according to the present invention.

For illustrating purposes, an exemplary timing controller for generating the vertical clock signal (VCK) and the vertical start signal (VST) is shown in FIG. 14*a*. As shown in FIG. 14*a*, the timing controller 112*v* includes a four-bit counter 128 whose outputs are connected to the output generation module 124. The four-stage counter 128 having output 134 on lines a, b, c, d to provide a counter count between 0 to 15 to generate the vertical start signal (VST). It is also possible to generate the vertical start and clock signals directly from the Hsync signal and the vertical synchronization signal, as shown in FIG. 14*b*.

Thus, it is seen that the size of the counter for the horizontal count as well as the size of the counter for the vertical count, has substantially fewer binary stages than that which is otherwise required if the entire horizontal line is counted up to the point of the horizontal start signal and the number of lines are counted up to the generation of the vertical start signal. In this manner, the number of stages for the counters are significantly reduced from those of the prior art which results in substantial savings in the amount of area needed to generate these circuit components on the display panel, as well as the power consumption associated with the operation of these counters and the associated counter control circuitry.

Figure 4:
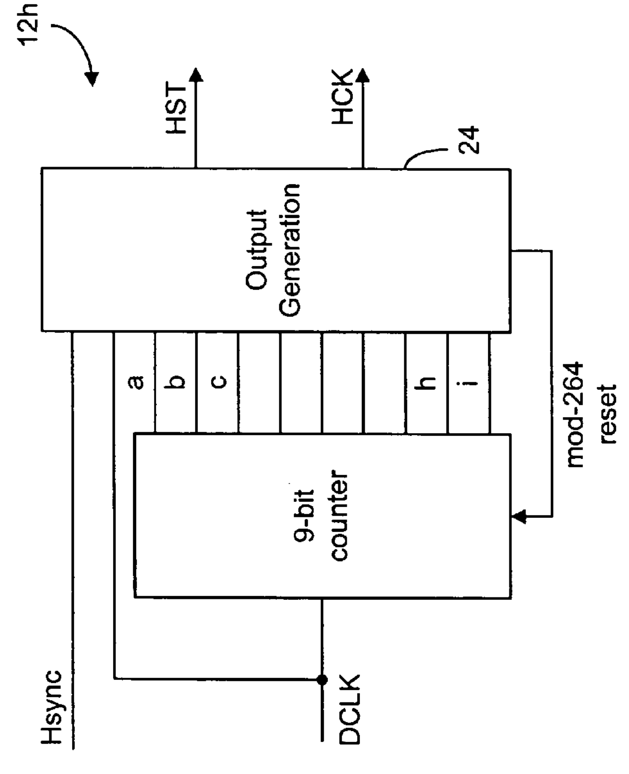
FIG. 4 (prior art)
FIG. 4 is a block diagram illustrating a typical prior-art timing controller for generating the horizontal clock signal and the horizontal start signal.
Figure 7:
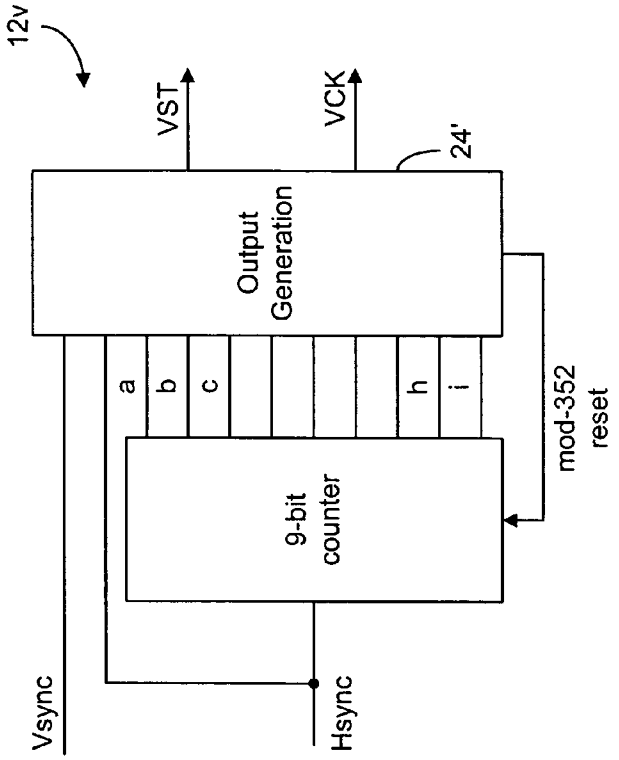
FIG. 7 (prior art)
FIG. 7 is a block diagram illustrating a typical prior-art timing controller for generating the vertical clock signal and the vertical start signal.
Figure 5:
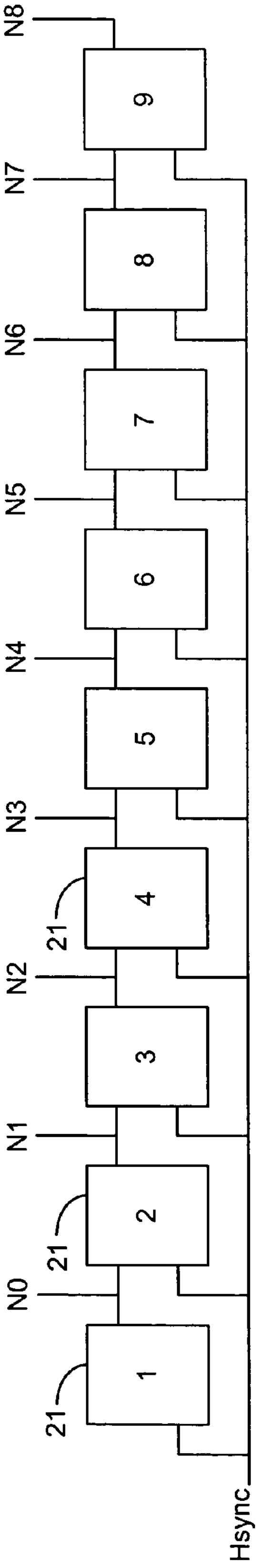
FIG. 5 (prior art)
FIG. 5 is a schematic diagram of a nine digit binary counter used to count the vertical lines and associated blanking time for a QVGA standard display panel.

In summary, in prior art, a dot counter is used to count the clock cycles starting from a mod-264 reset, as shown in FIG. 4, to generate a horizontal start signal (HST) when the count on the dot counter reaches 255. Likewise, a line counter is used to count the horizontal synchronization signal cycles starting from a mod-352 reset, as shown in FIG. 7, to generate a vertical start signal (VST) when the count on the line counter reaches 339, for example. Thus, the dot counter is required to have at least 9 bits for generating the mod-264 reset, and the line counter is required to have at least 9 bits for generating the mod-352 reset. The present invention uses a partial dot counter to count the clock cycles starting when the horizontal synchronization signal changes from state one to state two in order to generate the horizontal start signal. Likewise, the present invention uses a partial line counter to count the horizontal synchronization signal cycles starting when the vertical synchronization signal changes from state one to state two. As such, the number of bits in the partial dot counter and the line counter, according to the present invention, can be smaller than 9 for the same display technology, such as a QVGA display.

It is therefore apparent to those skilled in the art that the example presented above is representative of the concepts and principles of the present invention but should not be interpreted in a limiting sense. Other modifications and alternative arrangements from what is disclosed herein, may be devised by those skilled in the art without departing from the spirit and scope of the present invention, and the appended claims are intended to cover such modifications and arrangements.

What is claimed is:

1. A method for generating a timing signal in a display panel based upon a first periodic signal and a second periodic signal, the first periodic signal having a first signal cycle, the second periodic signal having a second signal cycle smaller than $2^n$ first signal cycles but greater than or equal to $2^{(n-1)}$ first signal cycles, with n being a predetermined positive integer, said method comprising the steps of:

determining when the second periodic signal changes from state one to state two;

starting a count of the first signal cycles when the second periodic signal changes from state one to state two based on said determining; and generating for each second signal cycle an edge of the timing signal when said count reaches L first signal cycles, wherein $0 < L \leqq (2^k - 1)$ and $0 < k < n$, and wherein L, n and k are positive integers.

2. The method of claim 1, wherein the first periodic signal is a clock signal, the second periodic signal is a horizontal synchronization signal, and the timing signal is a horizontal start signal for controlling pixels in a horizontal line in a display panel.

3. The method of claim 1, wherein the first periodic signal is a horizontal synchronization signal, the second periodic signal is a vertical synchronization signal, and the timing signal is a vertical start signal for selecting at least one horizontal line in a display panel.

4. The method of claim 1, wherein state one is representative of a first voltage level of the second periodic signal and state two is representative of a second voltage level of the second period signal, and wherein the second voltage level is lower than the first voltage level.

5. The method of claim 1, wherein the second periodic signal changes from state one to state two at a first position in the second signal cycle, and the second period signal also changes from state two to state one at a second position within said second signal cycle, and wherein the first edge of the timing signal is located before the second position and the second edge of the timing signal is located after the second position.

6. The method of claim 1, wherein the second periodic signal changes from state one to state two at a first position in the second signal cycle, and the second period signal also changes from state two to state one at a second position within said second signal cycle, and wherein both the first edge and the second edge of the timing signal are located before the second position.

7. The method of claim 1, wherein the second periodic signal changes from state one to state two at a first position in the second signal cycle, and the second period signal also changes from state two to state one at a second position within said second signal cycle, and wherein both the first edge and the second edge of the timing signal are located after the second position.

8. The method of claim 1, wherein the second periodic signal changes from state one to state two at a first position in the second signal cycle, and the second period signal also changes from state two to state one at a second position within said second signal cycle, and wherein the first edge of the timing signal is located at the first position and the second edge of the timing signal is located at the second position.

9. A timing controller for use in a display panel having a plurality of pixels organized in a plurality of horizontal lines, the timing controller configured to receive a clock signal and a horizontal synchronization signal for providing a horizontal start signal, wherein the horizontal start signal is arranged to control the pixels in a horizontal line, wherein the clock signal has a clock cycle and the horizontal synchronization signal has a horizontal signal cycle smaller than $2^n$ clock cycles but greater than or equal to $2^{(n-1)}$ clock cycles, with n being a predetermined positive integer, the horizontal synchronization signal having state one and state two in each horizontal signal cycle, and wherein the horizontal start signal is arranged for providing a starting time for controlling the pixels in the horizontal line, the horizontal start signal having a horizontal signal edge, said time controller comprising:

a horizontal counter comprising at least k bits, responsive to a change of the horizontal synchronization signal, for starting a count of the clock cycles when the horizontal synchronization signal changes from state one to state two such that when said count reaches L clock cycles, said horizontal counter produces the horizontal signal edge in said each horizontal signal cycle, wherein L, n and k are positive integers such that $0<k<n$ and $L \leqq (2^k-1)$.

10. The timing controller of claim 9, further configured to receive a vertical synchronization signal for providing a vertical start signal, wherein the vertical start signal is arranged to select at least one of the horizontal lines of the pixels, the vertical synchronization signal having a vertical signal cycle smaller than $2^m$ horizontal signal cycles but greater than or equal to $2^{(m-1)}$ horizontal signal cycles, with m being a predetermined positive integer, the vertical synchronization signal having state one and state two in each vertical signal cycle, the vertical start signal having a vertical signal edge, said timing controller further comprising:

a vertical counter comprising at least j bits, responsive to a change in the vertical synchronization signal, for starting a further count of the horizontal signal cycles when the vertical synchronization signal changes from state one to state two such that when said further count reaches L' horizontal signal cycles, said vertical counter produces the vertical signal edge, wherein L', m and j are positive integers such that $0<j<m$ and $L' \leqq (2^j-1)$.

11. The timing controller of claim 9, wherein the horizontal counter comprises k binary counters, each binary counter having an output for providing the count of the clock cycles, and wherein the horizontal counter is arranged to receive the clock signal and the horizontal synchronization signal through a logic component such that the horizontal counter is caused to count the clock cycles in each horizontal signal cycle only when the horizontal synchronization signal is in state two.

12. The timing controller of claim 9, wherein the horizontal counter is arranged to receive the clock signal and the horizontal synchronization signal, the horizontal counter comprising k binary counters, each binary counter having an output for providing the count of the clock cycles of the clock signal in each horizontal signal cycle.

13. The timing controller of claim 9, wherein the horizontal counter is arranged to receive the clock signal and the horizontal synchronization signal, the horizontal counter comprising k binary counters, each binary counter having an output for providing the count of the clock cycles of the clock signal in each horizontal signal cycle so as to produce the horizontal signal edge based on said at least one of the leading edge and trailing edge of the horizontal synchronization signal, and to provide a signal to the horizontal counter so as to disable the horizontal counter after the horizontal signal edge is produced in each horizontal signal cycle.

14. The timing controller of claim 9, wherein n is equal to 9 and k is smaller than 9.

15. The timing controller of claim 14, wherein m is equal to 9 and j is smaller than 9.

16. The timing controller of claim 14, wherein k is equal to 4 and L is equal to or smaller than 11.

17. The timing controller of claim 16, wherein m is equal to 9, j is equal to 4 and L' is equal to or smaller than 9.

18. The method of claim 1, wherein k is smaller than or equal to 4, n is within a range between 5 and 9, and L is smaller than or equal to 15.

19. The timing controller of claim 9, wherein k is smaller than or equal to 4, n is within a range between 5 and 9, and L is smaller than or equal to 15.

20. The timing controller of claim 10, wherein j is smaller than or equal to 4, m is within a range between 5 and 9, and L' is smaller than or equal to 15.

* * * * *